United States Patent [19]

Bergthaller et al.

[11] Patent Number: 4,600,681
[45] Date of Patent: Jul. 15, 1986

[54] COLOR PHOTOGRAPHIC MATERIAL WITH AZO DICYANOIMIDAZOLE DYES

[75] Inventors: Peter Bergthaller, Bergisch Gladbach, Fed. Rep. of Germany; Jürgen Strauss, Melba, Australia; Hans-Volker Runzheimer, Elkhart, Ind.; Gerhard Wolfrum, Leverkusen, Fed. Rep. of Germany

[73] Assignee: Agfa-Gevaert Aktiengesellschaft, Leverkusen, Fed. Rep. of Germany

[21] Appl. No.: 748,837

[22] Filed: Jun. 26, 1985

[30] Foreign Application Priority Data

Jul. 6, 1984 [DE] Fed. Rep. of Germany ....... 3424899

[51] Int. Cl.$^4$ .................... G03C 1/40; G03C 5/54
[52] U.S. Cl. .................... 430/242; 430/222; 430/223; 430/241; 430/562
[58] Field of Search ............... 430/223, 225, 562, 222, 430/242, 241

[56] References Cited

U.S. PATENT DOCUMENTS

| | | | |
|---|---|---|---|
| 4,142,891 | 3/1979 | Baigrie et al. | 430/223 |
| 4,396,710 | 8/1983 | Bergthaller et al. | 430/223 |
| 4,418,143 | 11/1983 | Bergthaller et al. | 430/223 |
| 4,420,550 | 12/1983 | Evans et al. | 430/223 |
| 4,524,123 | 6/1985 | Schenk et al. | 430/223 |

*Primary Examiner*—Richard L. Schilling
*Attorney, Agent, or Firm*—Connolly and Hutz

[57] ABSTRACT

Metal complexes, particularly copper and nickel complexes of azo dyes corresponding to general formula (I) are suitable as color dyes for the production of color images by the dye diffusion transfer process. The dyes are (in non-metallized form), in the form of so-called "dye-releasers", bound to a redox-active carrier radical provided with a ballast group, which dye-releasers are associated to a light-sensitive silver halide emulsion layer. During development, the metallizable dyes are image-wise released and are converted, after diffusion into a light-receiving layer, into the corresponding metal complexes

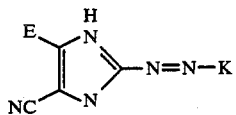

wherein
E represents an electron acceptor radical; and
K represents the radical of an azo coupler component, derived from an open-chain or closed ring ketomethylene compound, a cyclic enamine compound or a phenolic compound.

2 Claims, No Drawings

COLOR PHOTOGRAPHIC MATERIAL WITH AZO DICYANOIMIDAZOLE DYES

This invention relates to a colour photographic recording material for the production of colour images by the dye diffusion transfer process, which recording material contains a non-diffusing dye-providing compound associated to at least one light-sensitive silver halide emulsion layer, from which compound a diffusible complexable azo dye is freed during development.

The dye diffusion transfer process is based on the production in a light-sensitive element of an image-wise distribution dependent on preceding exposure of diffusible dyes during development and the transfer of this image-wise distribution to an image-receiving element. In certain cases, the light-fastness of the colour images produced by such a process may be improved in known manner by using dyes which are complexable by metal ions, such as tridentate azo dyes, which form stable dye-metal complexes on subsequent treatment with suitable metal ions. The improvement in light-fastness of azo images, whether obtained by the dye diffusion transfer process or by other photographic processes, such as the silver dye bleaching process, by complexing with metal ions is known, for example, from Nos. DE-B-1, 116, 532 or DE-B-1, 125, 279.

DE-A-2, 740, 719 describes generally heterocyclic azo dyes, the metal complexes, particularly the nickel, copper or palladium complexes, of which serve as light-fast image dyes for the dye diffusion process and should cover the entire trichromatic region between yellow and cyan.

Usable yellow image dyes having very good light-fastness include the metal complexes of 2-hydroxyphenylazoenols, which are the particular subject of No. DE-A-2, 913, 140.

Usable magenta dyes include the metal complexes of pyridyl-or pyrimidyl-azonaphthol derivatives, which are described inter alia in U.S. Pat. No. 4,204,870 and U.S. Pat. No. 4,207,104.

The clarity and light-fastness of the metal complexes is emphasised. If these are hydrolysable precursors of the relevant dyes, that is if dyes are used which contain a hydroxyl group in hydrolysably-blocked form adjacent to the azo group, then the tautomerism of the OH group is suppressed, that is the chromophore is, for example, fixed by acylation in a tautomeric form characterised by short-wave bands and relatively low extinction values. The use of the "shifted" form prevents the filtering effect of the dye causing loss of photographic sensitivity.

It is known that dyes which are shifted by acylation are unstable and gradually become deacylated when stored in the presence of residual moisture in a gelatine layer, with the result that the optical transmission of the layer is gradually reduced during storage and consequently the sensitivity of the relevant light-sensitive silver halide emulsion is reduced.

It is therefore desirable to use post-complexable monoazo dyes of the so-called "tridentate-type" which have substantially reduced adsorption even without the hydroxyl group being blocked by acylation (in the form of an acylated phenolic hydroxyl group, as described in U.S. Pat. No. 4,148,643) and only achieve the high extinction of the image dye complex after action by the complexing metal ion, preferably a nickel or copper ion.

It has been found that the object of the present invention may be achieved in a particularly straightforward manner if non-diffusing compounds obtained by azocoupling of 2-diazo-4,5-dicyanimidazole with suitable coupler components are used as dyereleasers.

The present invention relates to a colour photographic recording material for the production of colour images by the dye diffusion transfer process, which recording material contains a non-diffusing dye-providing compound associated to at least one light-sensitive silver halide emulsion layer, from which compound a diffusible azo dye, complexable by metal ions, is freed under the conditions of alkaline development as a function of the development of the silver halide emulsion layer, characterised in that the azo dye corresponds to the following general formula I:

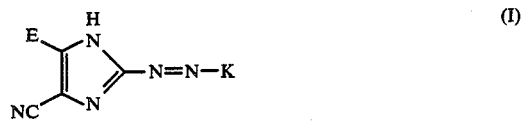

wherein
E represents an electron acceptor radical; and
K represents the radical of an azo coupling component which is derived from an open-chain or closed ring ketomethylene compound, a cyclic enamine compound or a phenolic compound.

The electron acceptor radical designated by E in general formula (I) is, for example, a cyano group or a radical derived from the cyano group of the diazo component 2-amino-4,5-dicyanimidazole when the coupling and processing conditions facilitate a partial or complete hydrolysis of the cyano group. Examples of such radicals are the groups —CO—NH$_2$ and —COOH.

The identity of K is determined by the choice of coupler components. The coupler component contains a linking member by which the chromophor as present in the dye-releaser is linked to a so-called "non-diffusing carrier radical".

Depending on the type of coupler component used, the chromophors have, after the metallizing stage, a shade between yellow and cyan. Coupler components of the following classes of compounds are particularly suitable for metallizing to produce image dyes of the trichromatic range yellow:

β-keto acid esters,
β-keto acid amides, such as acetoacetic acid amides, benzoylacetic acid amides or pivaloylacetic acid amides,
cyanacetic acid esters,
cyanacetic acid amides or
cyanoketones,
pyridines, particularly hydroxypyridones,
barbituric acids,
uracils,
pyrazolones,
malonic acid amides.

Phenolic compounds, particularly naphtholic couplers or couplers having an electron distribution substantially corresponding to that of naphthols, such as hydroxyquinazolines, hydroxychinolines, hydroxycinnolines or hydroxyquinoxalines, are particularly suitable for metallizing to produce image dyes of the trichromatic range magenta.

Naphtholic couplers are also suitable for metallizing to produce image dyes of the trichromatic range blue to cyan, as long as these couplers support either additional substituents having a donor function or further condensed rings. These include first and foremost; derivatives of H-acid,
derivatives of M-acid,
derivatives of I-acid, and
4-alkoxynaphthols-1.

The dyes of formula I have, for example, in the form of one or more substituents on the coupling component represented by K, suitable functional groups for adjusting to a suitable diffusion and mordanting behaviour, for example, anionic groups or groups convertible thereto, such as sulphonate, sulphinate, phenolate, carboxylate, disulphimide or sulphamoyl groups, and a functional group which results from the splitting of a bond on a carrier radical provided with a ballast group and is characteristic of the type of support radical and the link thereon. The latter functional group may be the same as the afore-mentioned diffusion and mordanting behaviour-modifying groups. The aforementioned functional group may, for example, be bound to an alkyl or aryl radical which is a constituent of the coupling component.

General formula (I) relates to the diffusible dyes according to the present invention freed during development. These are freed from corresponding incorporated non-diffusing dye-providing compounds (dye-releasers). These are compounds in which a dye radical (I) is bound to at least one ballast group-containing carrier radical CAR, optionally with the intercalation of a suitable linking member.

The dye of formula I is linked to the carrier radical via suitable substituents or intermediates in the radical of the coupling component K. The dye-releasers according to the present invention may be represented by the following general formula (II):

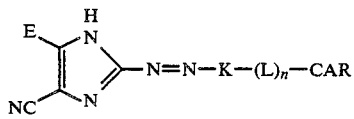
(II)

wherein E and K are as defined above;
CAR represents a carrier radical containing at least one ballast radical;
n represents 0 or 1; and
L represents a linking member, by which the electronic influence of the chromophor by the carrier is optionally desirably controlled, the solubility of the dye in the alkaline processing medium is influenced and the adhesion of the mordanted chromophor in the image-receiving layer may be improved.

The carrier radical formed by CAR contains, in addition to the ballast radical, at least one group which is separable as a function of the development of a silver halide emulsion layer, with the result that the dye bound to the carrier radical may optionally be separated, together with a small fragment of the original carrier radical, from the ballast radical(s) and may thus be loosened from its anchoring in the layer. The carrier radicals may have different structures depending on the function of the separable group.

the dye-releasers according to the present invention may be a plurality of types of compounds, which are all distinguished by a blinding member which is redox-dependent in its binding strength, which binding member links the chromophor to the non-diffusing carrier radical.

Reference is made in this context to a summary of this field in Angew. Chem. Int. Ed. Engl., 22, (1983), 191-209, in which the most important of the known systems are described.

For the present purposes, redox-active dye-releasers of the following type:

BALLAST - REDOX - DYE wherein
BALLAST represents a ballast radical;
REDOX represents a redox-active group, that is a group which is oxidizable or reducible under conditions of alkaline development and, depending on whether it is in an oxidized or reduced state, is subjected, to different degrees, to an elimination reaction, a nucleophilic displacement reaction, hydrolysis or another splitting reaction, with the result that the radical DYE is split off; and
DYE represents the radical of a diffusible dye, in the present case of a dye corresponding to general formula (I);
have proved particularly advantageous.

Those radicals are regarded as ballast radicals which enable the dye-releasers according to the present invention to be incorporated in a non-diffusing manner into the hydrophilic colloids conventionally used in photographic materials. Organic radicals are preferred for this purpose, which generally contain straight or branched-chain aliphatic groups, generally having from 8 to 20 carbon atoms and optionally also carbocyclic or heterocyclic, optionally aromatic groups. These radicals are either linked directly or indirectly, for example via one of the following groups, to the remaining part of the molecule: —NHCO—, —NHSO$_2$—, —NR—, R representing hydrogen or alkyl, —O— or —S—. The ballast radical may also additionally contain water-solubilizing groups, such as sulpho groups or carboxyl groups which may also be in an anionic form. As the diffusion properties are dependent on the molecular size of the entire compound used, it is sufficient in certain cases, for example if the entire molecule used is large enough, to use relatively shortchain radicals as ballast radicals.

The most varied embodiments of redox-active carrier radicals with the BALLAST-REDOX structure and suitable dye-releasers are known. A detailed description is unnecessary at this juncture, with reference to the following general article in Angew. Chem. Int. Ed. Engl., 22, (1983), 191-209.

For illustration, several examples of redox-active carrier radicals are given below, from which a dye radical is split off as a function of an image-wise oxidation or reduction:

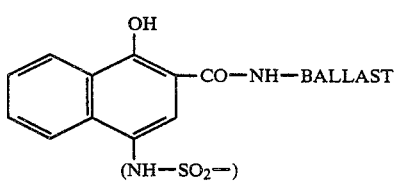

-continued

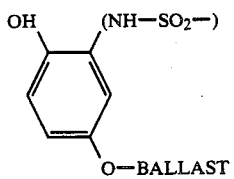

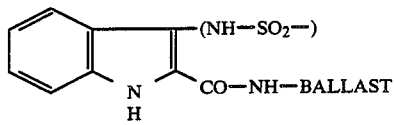

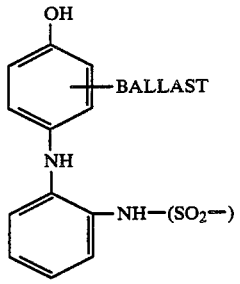

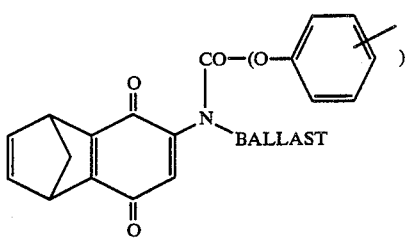

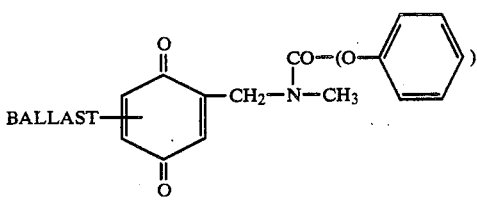

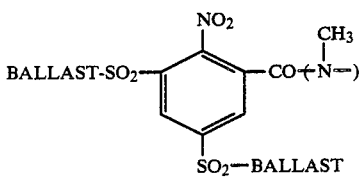

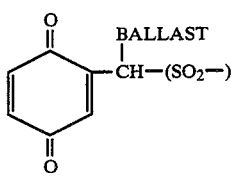

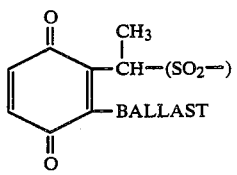

-continued

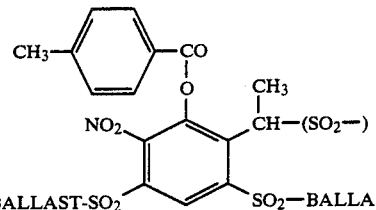

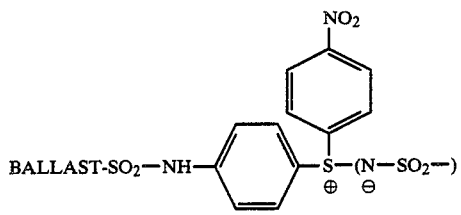

The bracketed groups are functional groups of the dye radical and are separated off, together with the latter, from the remaining part of the carrier radical. The functional group may be one of the substituents which may exert a direct influence on the absorption and complex-forming properties of the dyes according to the present invention. However, on the other hand, the functional group may also be separated from the chromophor of the dye acccording to the present invention by an intermediate or linking member. The functional group may optionally be of importance, together with the intermediate, for the diffusion and mordanting behaviour of the dyes according to the present invention. Suitable imtermediates are, for example, alkylene or arylene groups.

The latter-mentioned classes of reducible, reducibly-splittable dye-releasers are suitably used together with so-called "electron donor compounds" (ED compounds). The latter act as a reducing agent which is consumed image-wise during development of the silver halide and with its unconsumed part reduces the relevant dye-releasers associated to it and thereby splits off the dye. Suitable ED-compounds are, for example, non- or only slightly-diffusing derivatives of hydroquinone, benzisoxazolone, p-aminophenol or ascorbic acid (e.g. ascorbyl palmitate), which are described, for example, in No. DE-A-2, 809, 716. ED-compounds which are particularly preferred form the subject of No. DE-A-3, 006, 268.

Examples of suitable ED-compounds are given below:

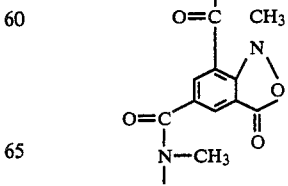

ED 1

ED 2 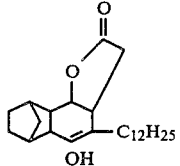

ED 3 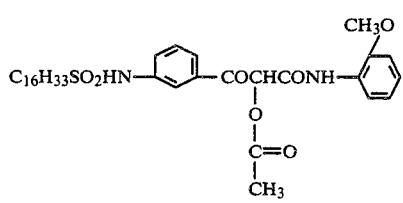

ED 4 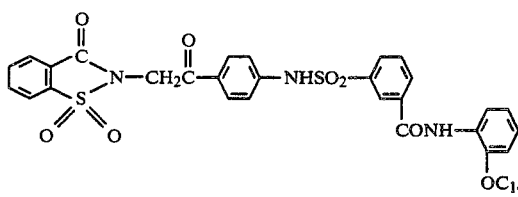

ED 5 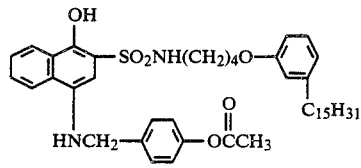

ED 6 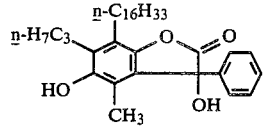

ED 7 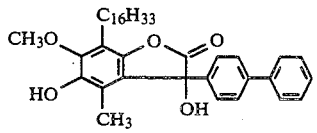

Examples of monoazo dyes, corresponding to general formula (I) according to the present invention which are metallizable to produce magenta nickel or copper complexes having favourable absorption and excellent light-fastness are given below.

The dyes which are marked by an asterisk (*) are model dyes which may be linked to separable support radicals by known preparative processes without causing disturbing changes in light-fastness and absorption, with the formulation of dye-releasers (II).

The information which may be derived from the model dyes about complex shade and light-fastness also holds true for the dye containing suitable separating groups.

Dye 1* 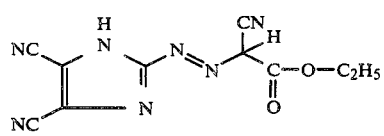

Dye 2* 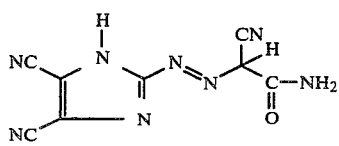

Dye 3* 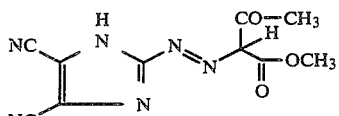

Dye 4* 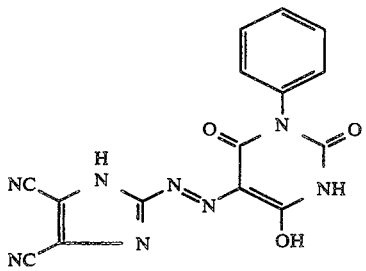

Dye 5* 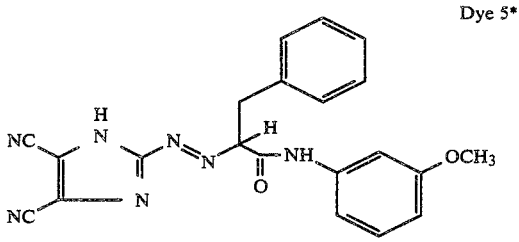

Dye 6* 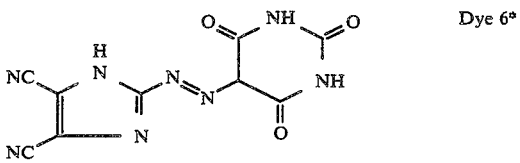

Dye 7* 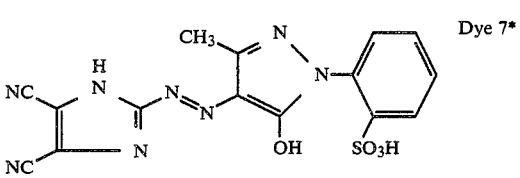

Dye 8* 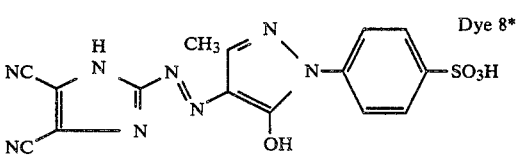

Dye 9* 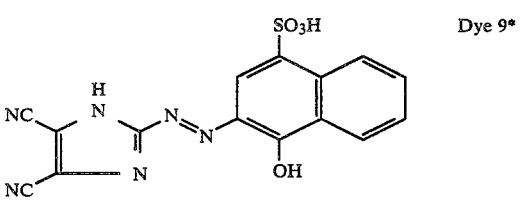

-continued

Dye 10
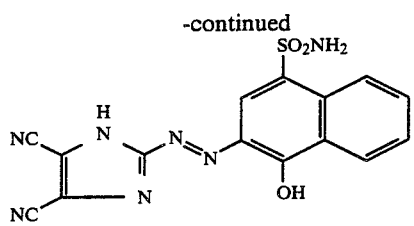

Dye 11*
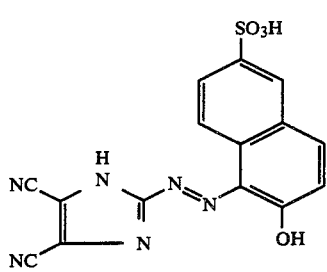

Dye 12*

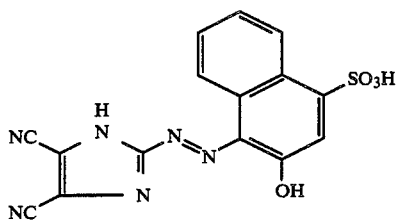

Dye 13*
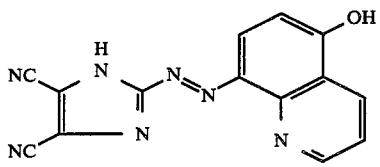

-continued

Dye 14*

Dye 15*
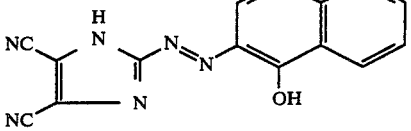

The dyes according to the present invention are produced from the known diazo component 2-amino-4,5-dicyanimidazole (for production and diazotisation, c.f. W. A. Sheppard, O. W. Webster, J. Amer. Chem. Soc., 95, (1973); U.S. Pat. No. 3,770,764). The above-mentioned coupler components are also known. Reference is hereby made to No. DE-A-2, 514, 581 in relation to monoazo dyes of 2-amino-4,5-dicyanimidazoles.

The properties of the dyes which are exceptionally favourable for use in relation to the dye diffusion process were, however, not yet known, and particularly not the excellent light-fastness and colourmetric properties. Examples of suitable dye-releasers (II) are given below.

Dye-releaser 1

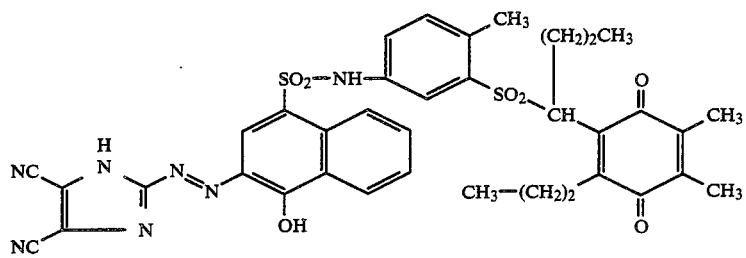

Dye-releaser 2

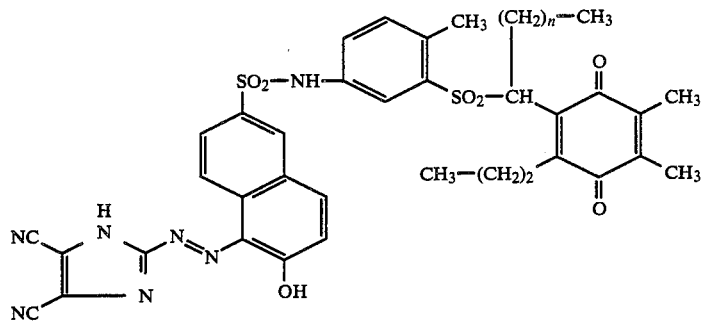

Dye-releaser 3

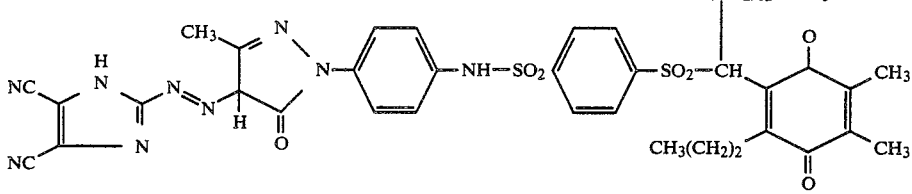

Dye-releaser 4

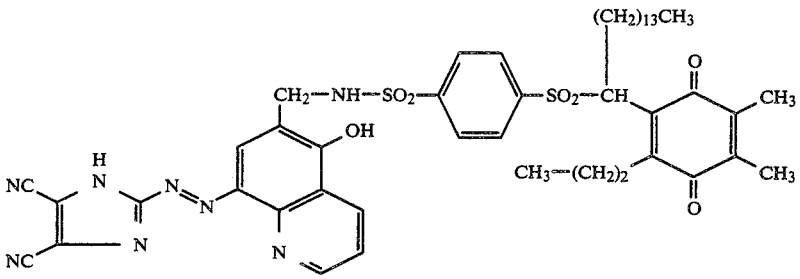

The production of some dye-releasers according to the present invention is described below.

Dye-releaser 1
Precursor 1.1

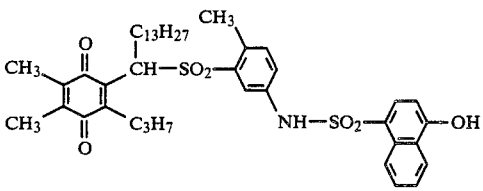

11 g (20 mmols) of 2,3-dimethyl-5-propyl-6-[α-(2-methyl-5-aminophenylsulphonyl)-tetradecyl]-benzoquinone-1,4 (production described in No. DE-A 3, 107, 540, page 51), dissolved in 200 ml of absolute pyridine, are mixed dropwise, at a temperature of from 5 to 10° C., with a solution of 9.2 g (32 mmols) of 4-acetoxynaphthalene-1-sulphochloride in 20 ml of absolute acetone and are stirred overnight at room temperature. The reaction mixture is poured into a mixture of 600 ml of iced water and 50 ml of concentrated ammonia and are subsequently stirred for 1 h at 0° C. (pH 8–9). The pH is adjusted to 4–5 using glacial acetic acid and is extracted three times, in each case with 200 ml of methylene chloride. After the organic phase has been dried over magnesium sulphate and the solvent has been removed at a temperature of from 20 to 30° C. (rotary evaporator), about 11 g of the product (support coupler 1) in the form of a brown oil are obtained which may be used without further purification for the synthesis of the dye.

DYE-RELEASER 1

A solution of 1.5 g (0.22 mmols) of NaNO$_2$ in 15 ml of water are added dropwise at a temperature of 0° C. to a solution of 2.7 g (20 mmols) of 2-amino-4,5-dicyanimidazole in a mixture of 80 ml of glacial acetic acid and 20 ml of 10% hydrochloric acid and are subsequently stirred for ½ h. The excess of nitrite is removed by addition of 2 molar amidosulphonic acid solution. For coupling, 15 g (20 mmols) of support coupler 1 are added dropwise to 600 ml of acetone, to which 5 or 6 drops of 10% NaOH were added and, during coupling, the pH is adjusted to 4 by addition of 10% HCL and extraction is carried out 3 times, in each case using 200 ml of methylene chloride. The extracts are dried and concentrated using a rotary evaporator at a temperature of from 20° to 30° C. The crude dye in the form of a reddish-brown oil is dissolved in about 50 ml of glacial acetic acid and is successively mixed, with stirring, at a temperature of 0° C., with 150 ml of water, 50 ml of saturated NaOAc solution and 250 ml of saturated NaCl solution. The solution is subsequently stirred for 1 h at 0° C., is drawn off by suction and washed with cold water until the filtrate passes through without colouration. After drying in a desiccator, 13.5 g of dye are obtained which, according to chromatographic analysis (eluant: CHCl$_3$/methanol/H$_2$O:40/20/3), has minimal impurity and may be further purified by chromatography on a high pressure column.

DYE-RELEASER 2

A total of 12.5 g (44 mmols) of 6-acetoxynaphthalene-2-sulphochloride (recrystallized from ligroin) are introduced in small portions, at a temperature of from 5° to 10° C., to 21.7 g (40 mmols) precursor 1.1 dissolved in 250 ml of absolute pyridine. The reaction mixture is subsequently stirred overnight at room temperature and then poured into a mixture of 750 ml of iced water and 60 ml of conc. NH$_3$ (pH 8–9). After stirring for 1 h at a temperature of 0° C., the pH is adjusted to 4 using 10% hydrochloric acid and extraction is carried out three times, in each case using 200 ml of diethyl ether. The extracts are dried over MgSO$_4$ and concentrated using a rotary evaporator at a temperature of from 20° to 30° C. A dark brown oil is obtained which may be freed from solvent residues under high-vacuum and is thereby completely crystallized out. Yield: 23.7 g (79%) of a brown crude product, which according to thin layer chromatography (eluant: xylene/cyclohexane/methanol/CHCl$_3$: 200/200/200/400) consists of a couplable main product and 3 non-couplable subsidiary products. The melting point of the crude product is from 48° to 50° C. The crude product is used without further purification for synthesising the dye.

The reaction to produce the dye-releaser 2 is carried out in accordance with the aforementioned instructions.

Yield of crystalline crude dye is 14.2 g of a reddish-brown powder.

DYE-RELEASER 3

Precursor 3.1

1-(4-aminophenyl)-3-methyl-4-(4,5-dicyanimidazolyl-2-azo)-pyrazolone-5

13.3 g (0.1 mol) of 2-amino-4,5-dicyanimidazole are diazotised in a mixture of 100 ml of glacial acetic acid and 50 ml of 10% hydrochloric acid at a temperature of 0.5° C. using a solution of 7.3 g of $NaNO_2$ in 25 ml of water. The mixture is subsequently stirred for 1 h at a temperature of from 0° to 5° C., the diazonium salt precipitating. The excess of nitrite is destroyed by addition of amidosulphuric acid and a solution of 22.6 g (0.1 mol) of 1-(4-aminophenyl)-3-methyl-5-pyrozolonehydrochloride in 250 ml of glacial acetic acid are added dropwise. The pH is adjusted to from 4 to 5 using saturated aqueous sodium acetate solution and is left to stand overnight. The precipitated dye is drawn off by suction, stirred with 500 ml of water for 1 hour at room temperature and drawn off by suction again. After drying at a temperature of from 50° to 60° C. and grinding, about 20 g of yellowish-brown dye powder are obtained.

Precursor 3.2

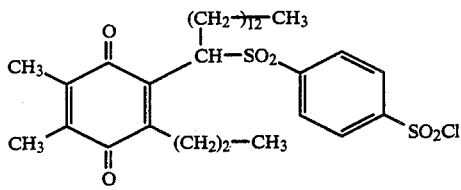

20 g of 2,3-dimethyl-5-propyl-6-[α-4-aminobenzenesulphonyl)-tetradecyl]-benzoquinone-1,4 are diazotised using 2.7 g of sodium nitrite in 100 ml of glacial acetic acid after addition of 10 ml of concentrated hydrochloric acid at a temperature of 15° C. Excess sodium nitrite is destroyed with 0.5 g of amidosulphonic acid and the mixture is poured, at a temperature of 10° C., into a solution of 35 ml of liquid $SO_2$, and 1.5 g of copper-II-chloride in 100 ml of glacial acetic acid. The mixture is then heated to 20° C. and subsequently stirred for 2 h. The solids material precipitated with 100 ml of water is drawn off by suction, washed to neutrality, dried and recrystallized from ethyl acetate/hexane. Yield is 20 g.

DYE-RELEASER 3

13.7 g (41 mmols) of precursor 3.1 are dissolved in a mixture of 100 ml abs. DMF and 200 ml abs. pyridine. 25.1 g '41 mmols) of precursor 3.2, dissolved in 50 ml abs. DMF, are added dropwise to the mixture. The mixture is subsequently stirred overnight at room temperature, mixed with 4 g of active carbon and heated to 110° C. for 20 min following hot filtration, the filtrate is stirred into 2 l of iced water and is acidified, while cooling with ice, with 450 ml of semi-concentrated hydrochloric acid (pH 1). The crude product is drawn off by suction, subsequently washed with about 100 ml of 10% hydrochloric acid, vigorously stirred twice in 500 ml of water, in each case as a moist filter cake, and drawn off by suction. After washing with water until neutral and drying over $P_2O_5$ in a desiccator, 28.2 g of yellow crystals are obtained.

For further purification, the product is separated from the precursor impurities by column chromatography over silica gel 60 (Merck) using 19.6 g of dye-releaser 3 in the form of yellow crystals are obtained.

For the dye diffusion transfer process the dye-releasers according to the present invention are incorporated into a colour photographic recording material in association to a light-sensitive silver halide emulsion layer. In monochromatic processes, such a recording material contains at least one light-sensitive silver halide emulsion layer, in comparison with processes for the production of multi-coloured images where the recording material contains at least three silver halide emulsion layers generally of different spectral sensitivities, a dye-releaser of formula (I) being associated to at least one of these layers according to the present invention. The dye-releasers release, during development, diffusible dyes which, after diffusion into an image-receiving layer, are complexed with nickel- or copper-II-ions.

The terms "association" and "associated" are used to mean that the reciprocal arrangement of light-sensitive silver halide emulsion layer and dye-releaser is such that, during development, an interaction between them is possible, which permits the release of the diffusible complexible monoazo dye as a function of the development of the silver halide emulsion layer. For this purpose, the light-sensitive halide and the dye-releaser do not necessarily have to be in the same layer: they may also be accomodated in adjacent layers which belong to the same layer unit.

If the dye-releasers according to the present invention are reducible reducibly splittable compounds, which are suitably used together with ED-compounds (or the precursors thereof, e.g. according to No. DE-A-3,006,268), association is to be understood as meaning that the reciprocal arrangement of silver halide emulsion, ED-compound or ED-precursor compound and dye-releaser is such that an interaction is possible between them, which permits an image-wise agreement between the formed silver image and the consumption of ED-compound, on the one hand, and between the not consumed ED-compound and the dye releaser, on the other hand, with the result that an image-wise distribution of diffusible dye is produced in accordance with the undeveloped silver halide.

Although the most varied methods may be used to incorporate the dye-releasers according to the present invention, it has proved favourable to incorporate the dye-releasers according to the present invention into the layers in emulsified form using so-called "oil-formers". Particularly when using reducible reducibly-splittable dye-releasers in conjunction with ED-compounds this provides the advantage that dye-releasers and ED-compounds in the form of a common emulsion may be brought into particularly close functional contact. Suitable oil-formers are described, for example, in U.S. Pat. No. 2,322,027, No. DE-A-1, 772, 192, No. DE-A-2, 042, 659 and No. DE-A-2, 049, 689. The optimum quantity of dye-releaser and optionally the ED-compound to be incorporated may be determined by straight-forward routine tests. The dye-releaser according to the present invention is used, for example, in a quantity of from 0.05 to 0.5 mols and the ED-compound, if used, is used in a quantity of from 0.1 to 0.6 mols, per mol of silver halide.

The development of the image-wise exposed colour photographic recording material according to the present invention is initiated by treatment with an aqueous-alkaline, optionally highly-viscous, developing solution. The development auxiliary compounds necessary for development are either contained in the developing solution or may be completely or partially contained in one or more layers of the colour photographic recording material according to the present invention. During development, image-wise diffusible dyes released from the dye-releasers and are transferred to an image-receiving layer, which is either an integral constituent of the colour photographic recording material according to the present invention or is in contact with this material at least during the development period. The image-receiving layer may therefore be arranged on the same layer support as the light-sensitive element or on a separate layer support. The image-receiving layer consists essentially of a binder which contains mordant for fixing the diffusible dyes released from the non-diffusing dye-releasers. Long-chain quarternary ammonium or phosphonium compounds, such as those described in U.S. Pat. No. 3,271,147 and U.S. Pat No. 3,271,148, preferably serve as mordants for anionic dyes. Furthermore, certain metal salts and the hydroxides thereof, which form difficultly-soluble compounds with acidic dyes, may also be used. Moreover, polymeric mordants may also be used. Moreover, polymeric mordants may also be listed in this context, such as those described in No. DE-A-2, 315, 304, No. DE-A-2, 631, 521 or No. DE-A-2, 941, 818. The dye mordants are dispersed in the mordant layer in one of the conventional hydrophilic binders, such as in gelatin, polyvinyl pyrrolidone, completely or partially-hydrolysed cellulose esters. Of course, many binders may also act as mordants, for example polymers or nitrogen-containing quaternary bases, such as 2-methyl-4-vinylpyridine, 4-vinylpyridine, 1-vinylimidazole, as described, for example, in U.S. Pat. No. 2,484,430. Further usable mordanting binders are, for example guanylhydrazone derivatives of alkylvinylketone polymers, as described, for example, in U.S. Pat. No. 2,882,156, or guanylhydrazone derivatives of acylstyrene polymers, as described, for example, in No. DE-A-2, 009, 498. However, other binders, such as gelatin, are generally added to the latter-mentioned mordanting binders.

Furthermore, in the present case, the image-receiving layer or an adjacent layer thereto may contain heavy metal ions, particularly nickel- or copper-II-ions, which form the corresponding azo dye-metal complexes with the diffusible monoazo dyes according to the present invention, which complexes have the aforementioned advantageous properties with regard to absorption and stability. The metal ions may be contained in a complex bound form in the image-receiving layer, for example bound to certain polymers as described, for example, in Research Disclosure 18 534 (Sept. 1979) or in No. DE-A-3, 002, 287 and No. DE-A-3, 105, 777. However, it is also possible to produce the azo dye-metal complexes in the image-receiving layer after successful diffusion, in that the image-receiving layer having the image-wise distribution of dyes according to the invention produced therein is treated with a solution of a salt of one of the aforementioned heavy metals. The dye-releasers, image-wise remaining during development associated to the originally light-sensitive layers (as a negative to the transfer image) may also be converted into the corresponding azo dye-metal complexes by treatment with the relevant metal ions ("retained image"). In each case, the colour image produced with the colour photographic material according to the present invention consists of an image-wise distribution of metal complexes of dye-releasers according to the present invention or of the dyes released therefrom and optionally further dyes, which, in the latter case, are fixed in the image-receiving layer by means of the mordants contained therein.

Provided that the image-receiving layer remains in layer contact with the light-sensitive element, even after completion of development an alkali-permeable pigment-containing light-reflecting binder layer is generally located there between, which layer serves as the optical separation between negative and positive and as the aesthetic background for the transferred colour image. Such a light-reflecting layer may be pre-formed in known manner in the light-sensitive colour photographic recording material, but may also be produced in known manner during development. If the light-receiving layer is arranged between the layer support and the light-sensitive element and is separated from the latter by a pre-formed light-reflecting layer, the layer support has either to be transparent so that the colour transfer image produced may be observed therethrough or the light-sensitive element has, together with the light-reflecting layer, to be removed from the image-receiving layer, in order to free the latter. The image-receiving layer may also be the uppermost layer in an integral colour photographic recording material, in which latter case the exposure is suitably effected through the transparent layer support.

EXAMPLE 1

Dyes according to the present invention are compared with prior art dyes with regard to spectral date and light-fastness, and the following Table gives the absorption maximum wave-length ($\lambda_{max}$) and the percentage secondary density of the nickel complexes in relation to the main absorption and the percentage colour density reduction during irradiation in the xenotest apparatus.

Image-receiving sheet

An image-receiving sheet is produced by applying the following layers to a paper substrate which has been coated on both sides with polyethylene and is provided with an adhesive layer. The quantities relate to 1 m$^2$.

1. A mordant layer with 6 g of a polyurethane according to Example 3 of No. DE-A-2, 631, 521 and 5 g of gelatin.

2. A hardening layer with 0.1 g of gelatin and 0.15 g of instantaneous hardener:

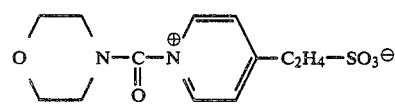

Each 1 strip of the resulting image receiving material is immersed in a 0.03 molar dye solution which has been made alkaline with 2% sodium hydroxide, and is dyed to a density of from 1.2 to 1.5 (measured on the reflection densitometer RD 514/Macbeth behind a red filer). The dyes listed in the following Table are used.

On completion of immersion treatment, the samples are rinsed with deionised water and are metallized by immersion in 2% nickel acetate solution.

All samples are subsequently rinsed under running water, subsequently treated with a 2% succinic acid buffer solution (pH 6) and dried.

The various stripes of dye are half-covered and irradiated with xenon light ($4.8 \cdot 10^6$ lx.h.). The percentage reduction in density $\Delta D/D_o$ may be seen from the following Table.

TABLE 1

| Complex Dye No. | Colour | $\frac{\Delta D}{D_o}$ |
| --- | --- | --- |
| 1 | yellow | +0% |
| 3 | yellow | −2% |
| 6 | yellow | −2% |
| 7 | yellow | −2% |
| 9 | magenta | −5% |
| 10 | magenta | −2% |
| 13 | magenta | −3% |

EXAMPLE 2

Light-sensitive element 1 (not according to the present invention)

The following layers are successively applied to a paper substrate which has been coated on both sides with polyethylene. All quantities relate to 1 m².

1. An unsensitized silver bromide iodide emulsion layer consisting of 0.5 g of AgNO$_3$ with 0.3 g of the dye-releaser A which is not according to the present invention, 0.16 g of ED-compound 6 (=compound 4 of the German Offenlegungsschrift 30 06 268), 0.46 g of palmitic acid diethylamide (common oil-former for dye-releaser and ED-compound) and 1.15 g of gelatin.

2. A protective layer containing 0.6 g of the monoacetylation product of 4-methyl-4-hydroxymethylphenidone, 0.12 g of 2-isooctadecyl-5-sulphohydroquinone and 0.6 g of gelatin.

3. A hardening layer containing 0.1 g of gelatin and 0.12 g of instantaneous hardener according to Example 1.

Dye-releaser A=quinone to compound 20 of EP application No. 0004399, corresponding to formula:

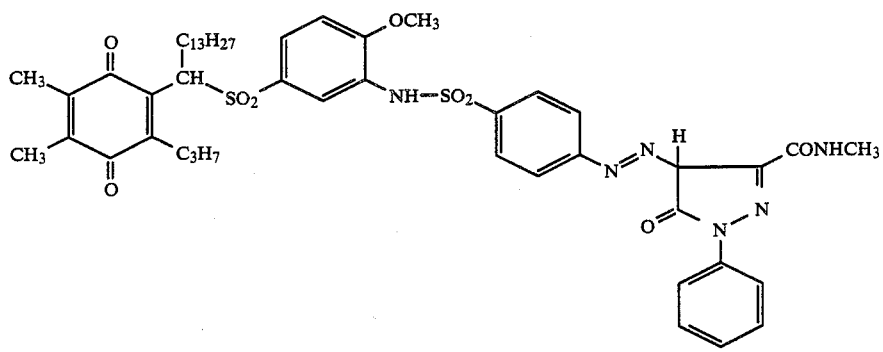

The image-wise light sensitive element which is exposed behind a step-wedge and an image-receiving sheet (c.f. Example 1) are steeped in a treatment solution with the following composition and are pressed together on the layer side:

925 g H$_2$O
30 g isobutanol
2 g Na$_2$SO$_3$
3 g KBr
40 g KOH

The sheets are separated from each other after a contact period of 2 min, and the image-receiving sheet is washed for 30 sec. After drying, the Dmin/Dmax values of the positive yellow dye wedge 1 are measured.

Light-sensitive element 2 (according to the present invention)

The light-sensitive element 2 differs from element 1 in that layer 1 contains a desensitized silver bromide iodide emulsion consisting of 1.33 g of AgNO$_3$, 0.45 g of dye-releaser 3 and 0.34 g of ED- compound 6.

Furthermore, the coating dispersion contains 0.9 g instead of 0.46 g of palmitic acid diethylamide. Processing is carried out as in the case of the light-sensitive element 1 in contact with a light-receiving sheet. After separation, the light-receiving sheet is rinsed with deionised water and is metallized by immersion in 2% nickel acetate solution. The light-receiving layer is subsequently neutralized by a succinic acid buffer bath (2% succinic acid, adjusted to pH 6) and dried. The Dmin/Dmax values are then determined.

The resulting dye wedges 1 and 2 are half-covered and subjected to xenon light arc exposure for 48 h ($4.8 \cdot 10^6$ lxh). Light fastness and photographic data are given in the following Table:

TABLE 2

| Colour image | Dye-releaser | $D_{min}$ | $D_{max}$ | $\frac{\Delta D}{D_o}$ |
| --- | --- | --- | --- | --- |
| 1 | A | 0.19 | 2.01 | −15% |
| 2 | 3 | 0.15 | 1.23 | ±0 |

It may be seen from the data that the increased light-fastness of the nickel complex in comparison with a conventional yellow dye may be regarded as a technical advantage.

We claim:

1. A colour photographic recording material for the production of colour images by the dye diffusion transfer process, which material contains a non-diffusing dye-providing compound associated to at least one light-sensitive silver halide emulsion layer, from which compound a diffusible azo dye which is complexable by metal ions is released under the condition of alkaline development as a function of the development of the silver halide emulsion layer, wherein the improvement comprises the azo dye corresponds to the following general formula (I):

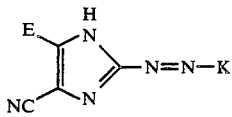
(I)

wherein
- E represents an electron acceptor radical selected from the group consisting of cyano and, carboxy or carbamoyl hydrolysis derivatives of cyano and
- K represents the radical of an azo coupling component, which is derived from an open-chain or closed ring ketomethylene compound, a cyclic enamine compound or a phenolic compound.

2. The method of producing an image by dye diffusion processing of an image-wise exposed color photographic material containing associated with at least one sensitive silver halide emulsion layer, a non-diffusible dye color providing compound while in contact with an image receptor layer, the method comprising the step of releasing from said non-diffusible dye color providing compound under alkaline development conditions an image dye comprising the azo dye corresponding to the following general formula

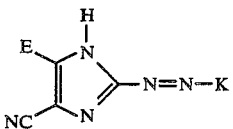

wherein
- E represents an electron acceptor radical selected from the group consisting of cyano, and carboxy, or carbamoyl hydrolysis derivatives of cyano; and
- K represents the radical of an azo coupling component, which is derived from an open-chain or closed ring ketomethylene compound, a cyclic enamine compound or a phenolic compound.

* * * * *